US008045552B2

(12) United States Patent
Unger

(10) Patent No.: US 8,045,552 B2
(45) Date of Patent: Oct. 25, 2011

(54) WIRED EXCHANGE OF CONTROL INFORMATION IN WIRELESS SYSTEM

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 853 days.

(21) Appl. No.: 12/048,493

(22) Filed: Mar. 14, 2008

(65) Prior Publication Data
US 2009/0178086 A1 Jul. 9, 2009

Related U.S. Application Data

(60) Provisional application No. 61/009,870, filed on Jan. 3, 2008.

(51) Int. Cl.
*H04L 12/28* (2006.01)
*H04L 12/56* (2006.01)
*H04N 7/18* (2006.01)

(52) U.S. Cl. ............................ 370/389; 370/419; 725/81

(58) Field of Classification Search ...................... None
See application file for complete search history.

(56) References Cited

U.S. PATENT DOCUMENTS

| | | | |
|---|---|---|---|
| 2006/0209745 A1 | 9/2006 | Macmullan et al. | |
| 2006/0209890 A1 | 9/2006 | Macmullan et al. | |
| 2008/0227384 A1* | 9/2008 | Placzek et al. | 455/3.06 |

* cited by examiner

*Primary Examiner* — Chirag Shah
*Assistant Examiner* — Srinivasa Reddivalam
(74) *Attorney, Agent, or Firm* — John L. Rogitz

(57) ABSTRACT

Pairing information is automatically exchanged over a temporary cable in a wireless high definition multimedia interface (HDMI) system. Subsequently, the cable is disconnected and a source of HDMI (such as a disk player) wirelessly sends HDMI A/V to a sink (such as a HDTV).

17 Claims, 6 Drawing Sheets

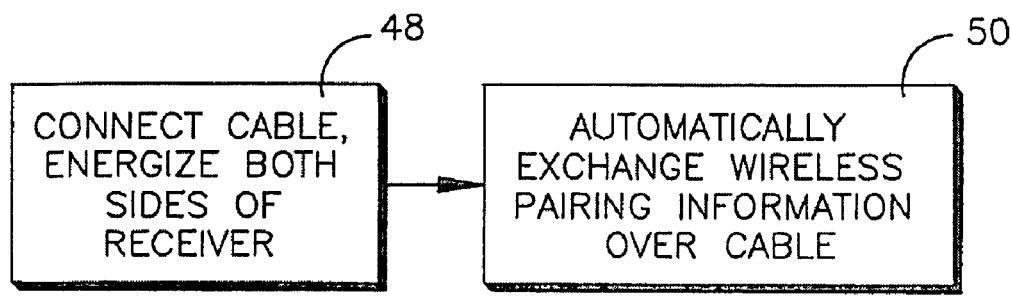
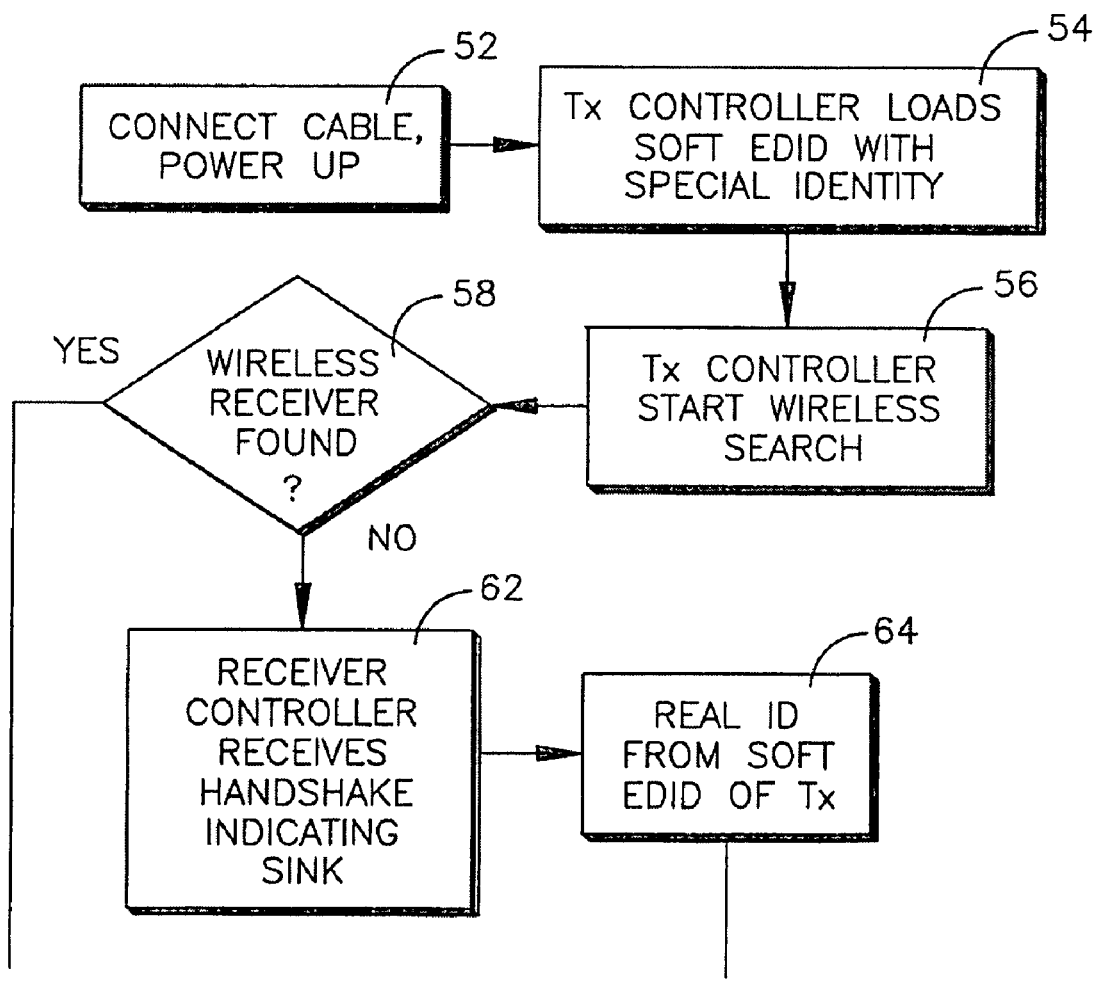

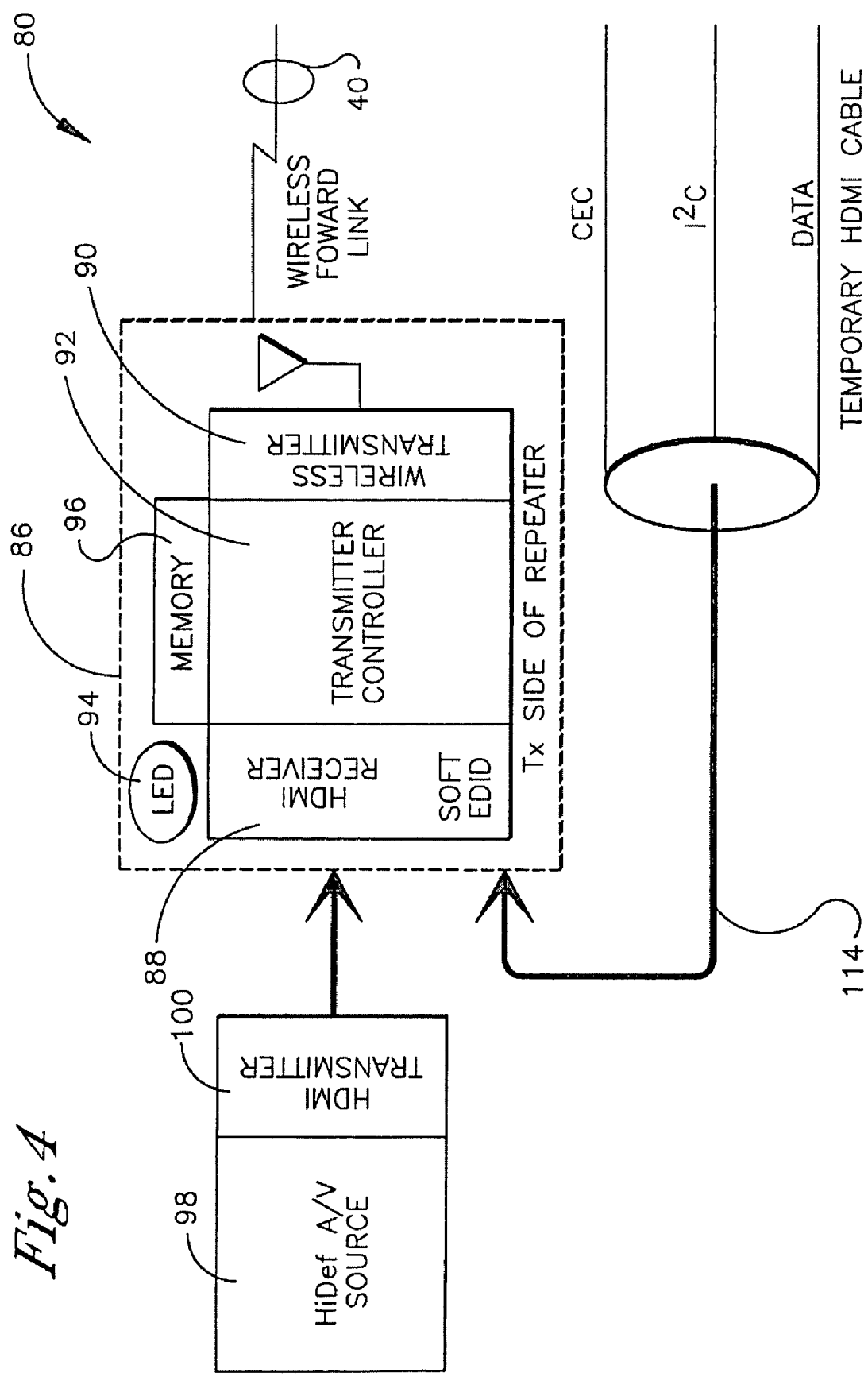

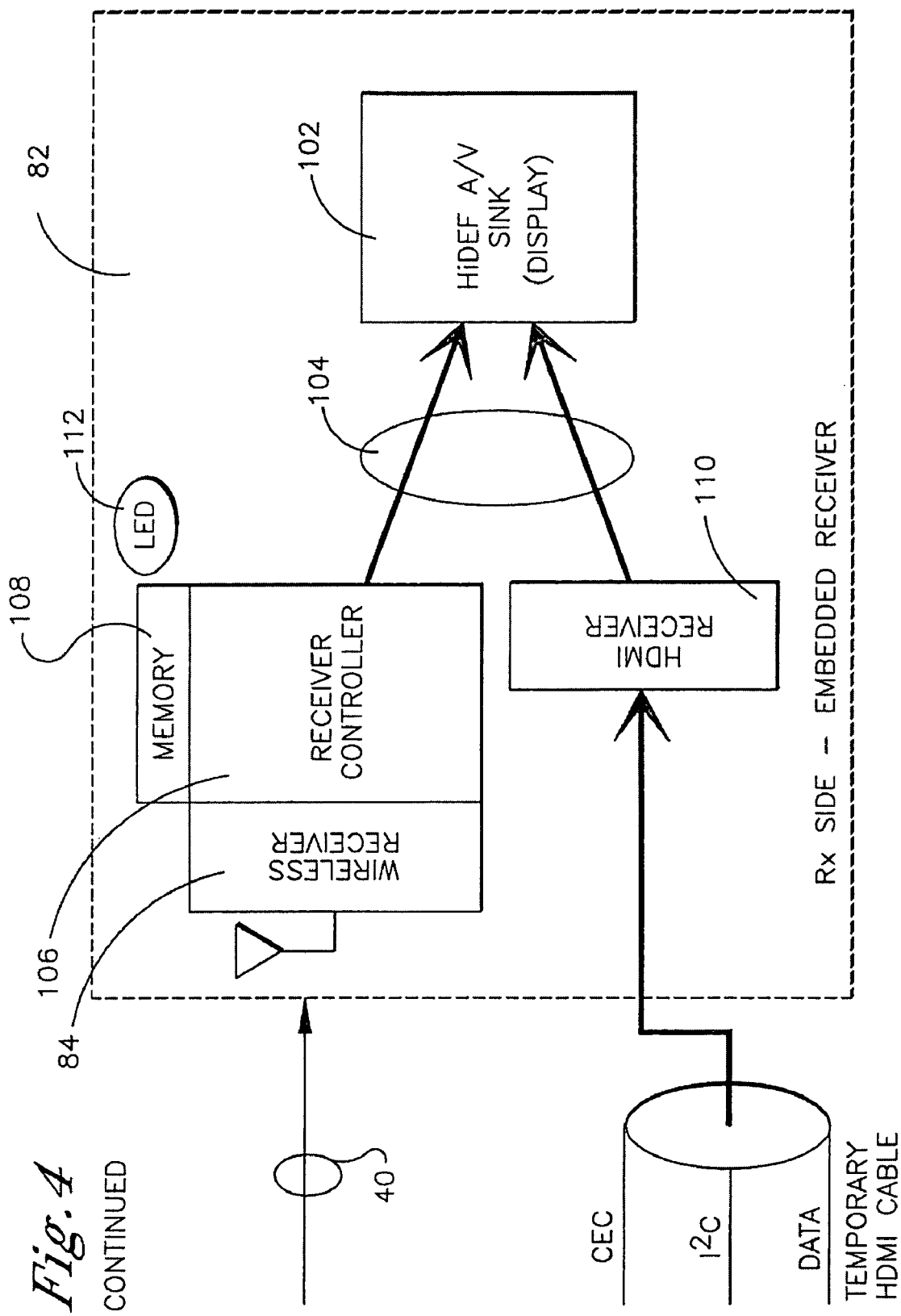

WIRED EXCHANGE OF CONTROL INFORMATION IN WIRELESS SYSTEM

Priority is claimed from U.S. provisional patent application 61/009,870 filed Jan. 3, 2008.

FIELD OF THE INVENTION

The present invention relates generally to exchanging pairing information in a wireless audio/video (A/V) transmission system and more particularly to the exchange over a temporary wire of pairing information in a wireless high definition multimedia interface (HDMI) system.

BACKGROUND OF THE INVENTION

There is no ambiguity about what devices are connected in a multimedia system when the attachment is via wire. However, connectivity for wireless devices requires a means to specify valid/authorized communication combinations. Each device must be able to recognize a legitimate partner and have shared secrets used to safeguard high value content. This pairing information is usually established as a genetic imprint at the factory or can be done as part of an adoption procedure in the field.

Hard pairing at the factory makes field repairs difficult and may preclude support for multiple pairings. Manual pairing by the end user can be complicated, cumbersome, annoying and subject to human error. Manual pairing is also vulnerable to security compromises. Any pairing needs to be as secure a process as HDCP.

SUMMARY OF THE INVENTION

A method for obviating the need for an end user to manually set pairing information to permit communication of A/V streams from a source to a sink. This involves temporarily repurposing a wired interface on each device. The wireless system is connected back on itself via the wired interface. Each device recognizes an "abnormal" wired connection an initiates an exchange of pairing information. This information is used to recognize a valid partner when the devices are operating wirelessly. It includes a partner ID that cannot be easily spoofed and shared secrets for secure data exchange.

When the wired connection is HDMI, HDMI characteristics can be used to identify the "abnormal" connection and authenticate a potential paired partner. This might include EDID data inappropriate for normal operation and CEC topologies that are invalid in the real world.

Accordingly, a method for obviating the need for an end user to manually set pairing information to permit communication of A/V streams from a source to a sink includes connecting a cable to a wireless high definition multimedia interface (HDMI) transmitter assembly and connecting the cable to a wireless HDMI receiver assembly. The wireless HDMI transmitter assembly is configured for wirelessly transmitting audio/video (A/V) information from a source of HDMI data to the wireless HDMI receiver assembly, which provides A/V to a sink device that can display HDMI information from the source. In response to energizing the assemblies, the transmitter assembly and receiver assembly are automatically caused to exchange pairing information over the cable. The cable can be removed and the source/sink components located in their intended permanent locations within, e.g., an end user's home. The pairing information is then used to send HDMI A/V information from the transmitter assembly to the receiver assembly over a wireless communication path. In some embodiments audible and/or visual indication can be provided on the assemblies indicating successful exchange of the pairing information.

In non-limiting implementations some pairing information may be exchanged over a consumer electronics control (CEC) bus of the cable. Some pairing information may be exchanged over an inter-integrated circuit ($I^2C$) bus of the cable. Non-limiting pairing information can include high definition content protection (HDCP) key selection vectors (KSV). The pairing information may further include a public key associated with a radio transmitter of the transmitter assembly.

In non-limiting specific embodiments the automatic exchange of pairing information can be done upon energization of the assemblies by causing the transmitter assembly to load, into a memory associated with the transmitter assembly, extended display identification data (EDID) indicating a wireless HDMI repeater. The transmitter assembly monitors for consumer electronics control (CEC) commands and the receiver assembly monitors for EDID indicating a wireless HDMI repeater. When the receiver detects such an EDID), the receiver sends, over a CEC bus of the cable, a signal indicating control signal connection. In response to receiving from the receiver assembly the signal indicating control signal connection, the transmitter assembly sends the pairing information to the receiver assembly over the cable.

In another aspect, an audio/video (A/V) receiver assembly is configured for receiving wireless signals representing A/V for display thereof on a display. The receiver assembly includes a transmitter configured for outputting A/V signals in a predetermined A/V format useful by the display. The receiver assembly further includes a receiver controller sending A/V signals to the transmitter. Also, the receiver assembly has a wireless receiver configured for receiving wireless signals from a transmitter assembly, and the wireless receiver sends the signals to the receiver controller. Pairing information necessary for wireless communication of A/V from the source to the sink is exchanged by the receiver controller and transmitter assembly automatically over a cable.

In still another aspect, an audio/video (A/V) transmitter assembly is configured for transmitting wireless signals representing A/V from a source of A/V. The transmitter assembly includes a receiver configured for receiving from the source A/V signals in a predetermined A/V format. A transmitter controller receives A/V signals from the receiver and a wireless transmitter is configured for wirelessly transmitting signals from the transmitter controller to a receiver assembly associated with a sink. Pairing information necessary for wireless communication of A/V from the source to the sink is received by the transmitter controller automatically over a cable from the receiver assembly.

This wired exchange of pairing information also works if both devices only have wired HDMI receivers. This is the case when the receiver is embedded in a television and the only wire HDMI is for additional inputs.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of the high level logic of the present invention, all or portions of which may be embodied on one or more of the tangible computer readable media disclosed herein;

FIG. 4 is a block diagram of another non-limiting system in accordance with present principles.

DETAILED DESCRIPTION OF THE PREFERRED EMBODIMENT

Figure 1:
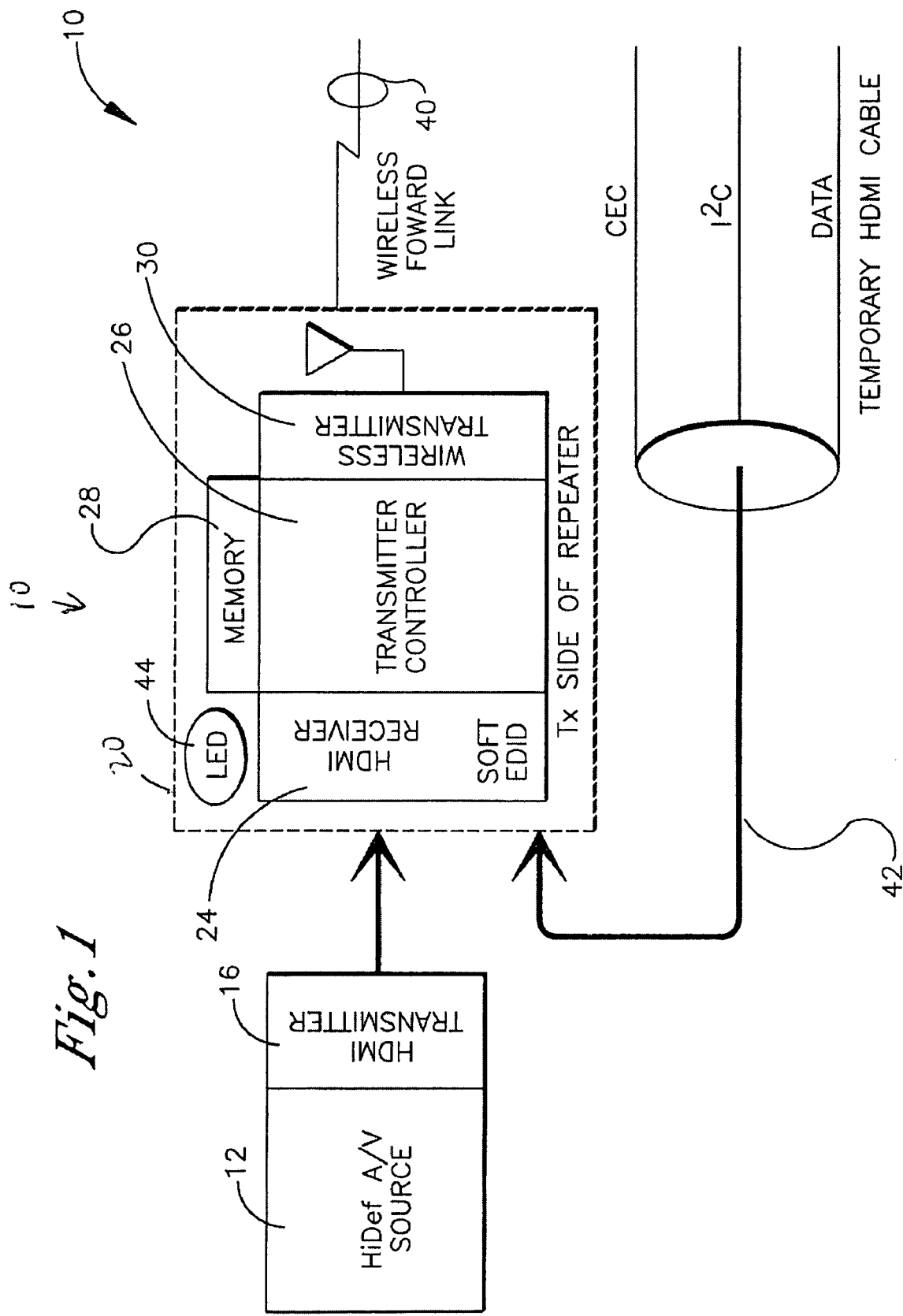
FIG. 1 is a block diagram of a non-limiting system in accordance with present principles.
Figure 1:
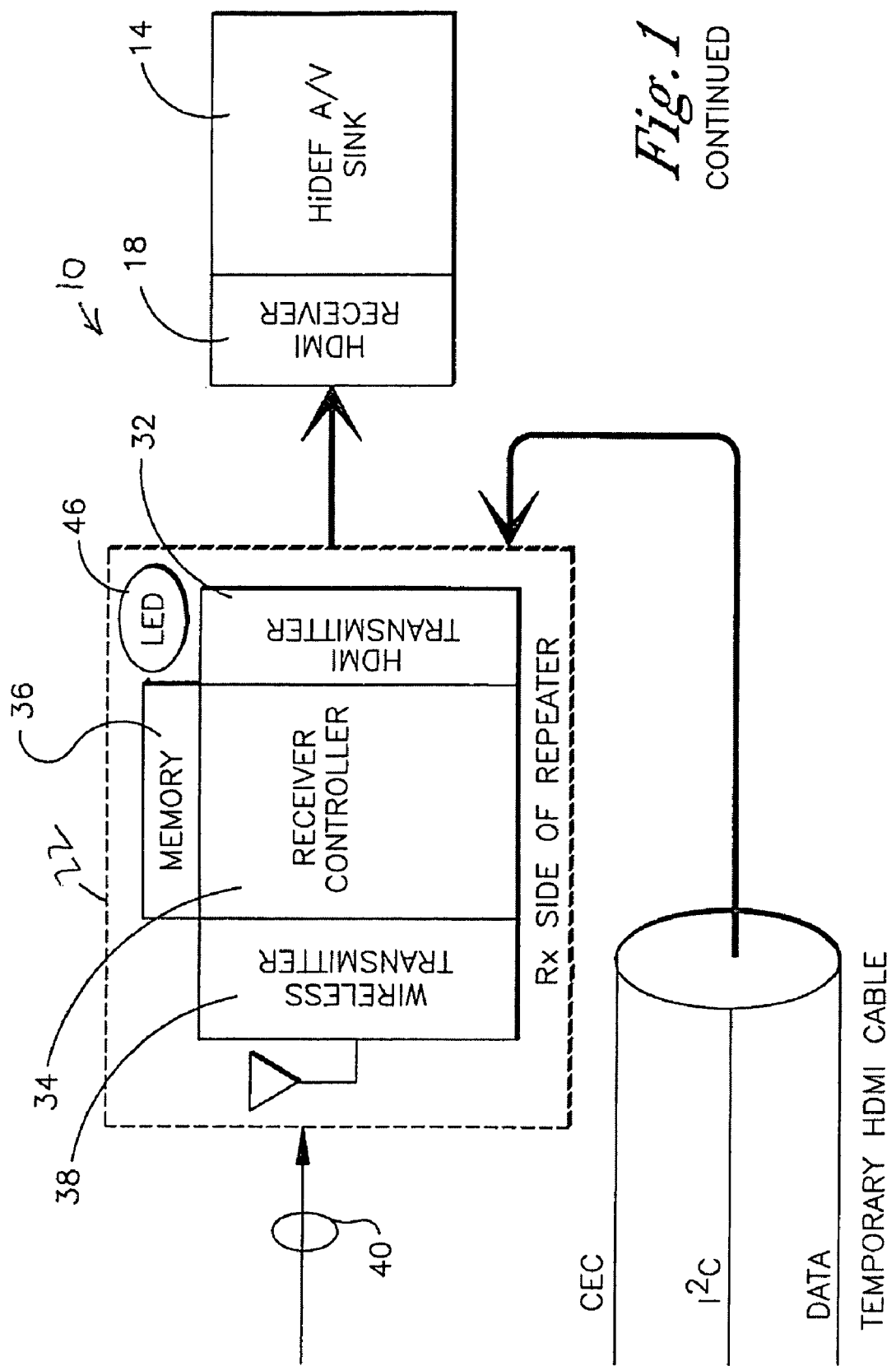

Referring initially to FIG. 1, a system is shown, generally designated 10, for wirelessly conveying audio/video (A/V) information from a source 12 such as but not limited to a disk player, projector, etc. to a sink 14 such as but not limited to a HDTV for display of the A/V on the sink. In some embodiments the A/V may use HDMI that employs HDCP encryption, in which case the source 12 can be associated with a HDMI transmitter 16 while the sink 14 can be associated with an HDMI receiver 18. The transmitter 16 may be incorporated in the chassis of the source 12 or it may be a separate module. Likewise, the receiver 18 may be incorporated in the chassis of the sink 14 or it may be a separate module.

To support communication of HDMI from the source to the sink, a HDMI repeater may be provided and may include a transmitter side repeater half 20 and a receiver side repeater half 22. The transmitter side repeater half 20 typically includes a HDMI receiver for receiving, from the HDMI transmitter 16 of the source, A/V streams in HDMI format. The HDMI receiver 24 may include a "soft" extended display identification data (EDID) device that is normally used to reflect data in an EDID of the sink. The soft EDID may alternatively be contained on a transmitter controller 26 that receives data from the HDMI receiver 24 or in a tangible computer-readable medium 28 such as but not limited to a solid state memory that the transmitter controller 26 can access. The transmitter controller 26 may be a digital microcontroller. In any case, the transmitter controller 26 outputs data to a wireless transmitter 30 for transmission of the data to the receiver side repeater half 22.

Indeed, now turning to the receiver side repeater half 22, a HDMI transmitter 32 is provided for sending HDMI formatted signals to the HDMI receiver 18 of the sink. The HDMI transmitter 32 of the receiver side repeater half 22 receives data from a receiver controller 34 that can access a tangible computer-readable medium 36 such as but not limited to a solid state memory. The receiver controller 34 in turn receives data from a wireless receiver 38, which communicates with the wireless transmitter 30 over a wireless forward communication link 40 as shown.

The repeater halves 20, 22 may be incorporated with their respective source 12 and sink 14 or may be separate modules therefrom.

The wireless forward communication over the link 40, as understood herein, may require that certain pairing information be exchanged between the receiver side 22 and transmitter side 20. To avoid requiring the end user to manually input pairing information into both devices and to also avoid promiscuous wireless exchange of the information prior to exchanging necessary encryption keys that are normally part of the pairing information, a temporary HDMI cable 42 can be connected in place of the source/sink devices to both the transmitter and receiver repeater sides 20, 22 as shown. This can occur by the end user simply by conveying one of the sides 20, 22 next to the other, connecting the cable 42, and after completion of the logic below disconnecting the cable and placing the repeater sides 20, 22 in their desired permanent locations within the dwelling.

As shown, the HDMI cable 42 can include three buses, namely, a data bus over which HDMI data can be exchanged, and what can be thought of as two pairing information buses. Specifically, the cable 42 can include a consumer electronics control (CEC) bus and an inter-integrated circuit ($I^2C$) bus.

Completing the description of FIG. 1, one or both repeater halves 20, 22 may include a respective audible and/or visual indicator, such as but not limited to a light emitting diode (LED) 44 on the transmitter repeater half 20 and a LED 46 on the receive repeater half 22, for purposes to be shortly disclosed.

FIG. 2 shows the overall logic. Commencing at block 48, the cable 42 is connected to both repeater halves 20, 22 and the repeater halves are energized. At block 50, pairing information necessary for subsequent wireless communication over the wireless link 40 is exchanged over the cable 42. The cable may then be disconnected and the wireless link 40 used exclusively as the only communication link between the repeater halves 20, 22 and, thus, between the source 12 and sink 14. The end user may be instructed to execute this logic, with an indication being given (e.g., illuminating both LEDs 44, 46) upon successful completion of pairing information exchange so that the end user knows that the cable may be removed and wireless communication established to send A/V from the source 12 to the sink 14 using the repeater halves 20, 22.

Figure 3:
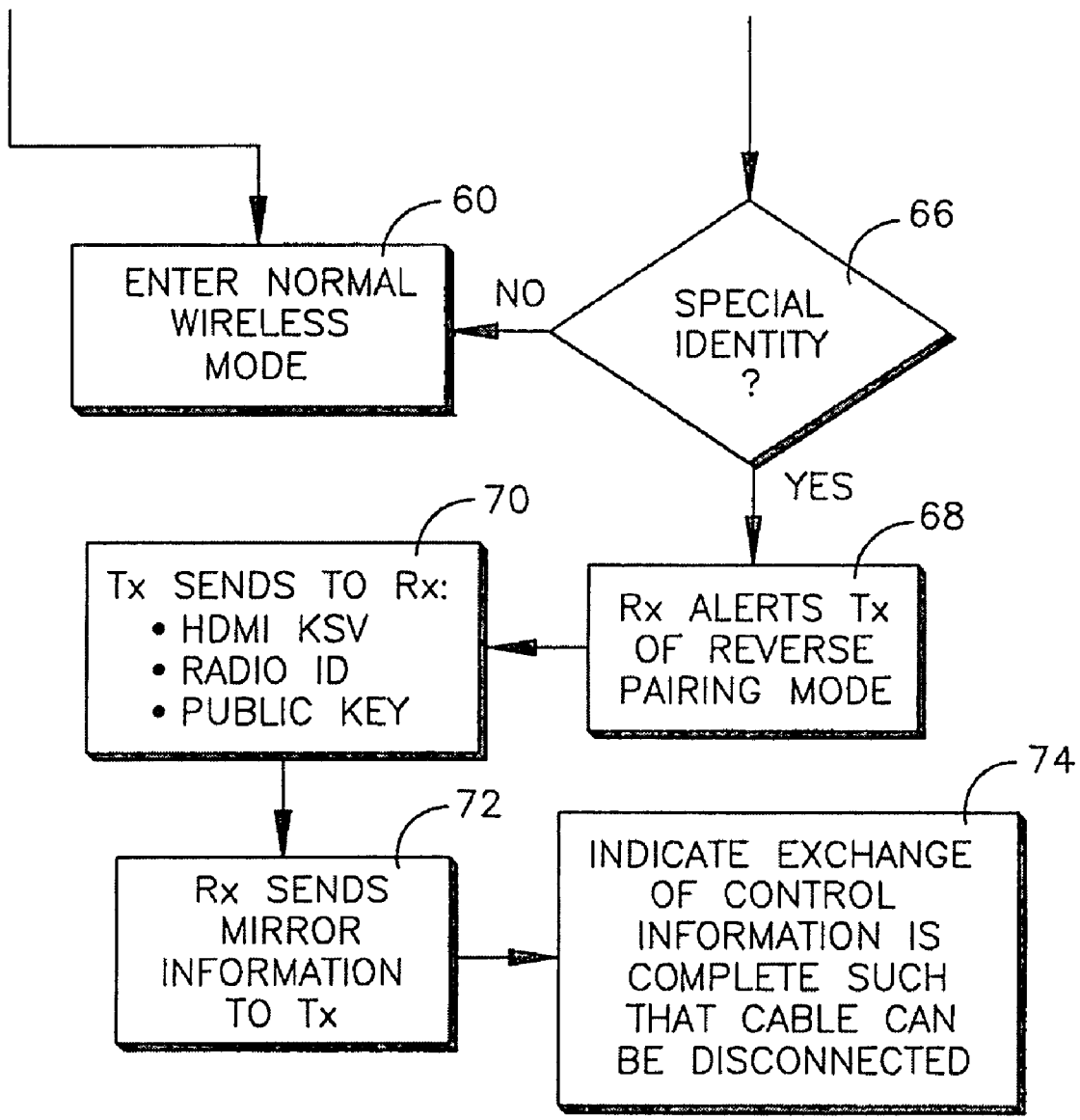
FIG. 3 is a flow chart of non-limiting logic that may be employed in accordance with an embodiment of the invention, all of portions of which may be embodied on one or more of the tangible computer readable media disclosed herein.

FIG. 3 shows detailed logic that may be implemented in some embodiments. Commencing at block 52, the cable 42 is connected to the repeater halves 20, 22 and the halves 20, 22 are energized. Automatically at block 54, i.e., without further user action, the transmitter controller 26 detects the presence of the cable 42 and in response loads its soft EDID with a special identity. The special identity is not the identity of a display device as is the case once pairing information exchange has been completed but rather an identity that indicates a wireless repeater. Then, at block 56 the transmitter controller 26 begins a wireless search for wireless receiver, also monitoring for CEC commands.

At decision diamond 58, if a wireless receiver is found and recognized, normal wireless mode operation commences at block 60. This test for special identity refers in one implementation to the device type declared in the EDID ROM. The detection of this special identity is used to trigger the pairing process of one implementation of the present invention. The EDID identity is not unique to a device but is the flag for triggering. There is no abort should pairing information pre-exists for another device.

More specifically, multiple valid pairings are possible for both receivers and transmitters. The information for each valid partner is preserved in a table. During normal wireless operation, any connection overture from a device in the table is permitted to activate.

For example, a pair of devices may be purchased for use in a living room. (These may have been paired at the factory of paired in the field using this invention.) Assume the consumer purchases a second system for use in the bedroom. Present principles are then used to pair the devices newly purchased to be valid partners for the devices already in the living room. After multiple pairing, content from the living room transmitter can be viewed in the bedroom and vice versa. Devices in a neighboring apartment, however, would not be established as valid partners and advantageously cannot participate in wireless data exchange.

Thus, the branch from decision diamond 58 to block 60 occurs after pairing information has been exchanged with the detected wireless receiver, meaning that unless pairing information already has been exchanged, the process branches from decision diamond 58 to block 62 to execute a non-limiting embodiment of present principles.

At block 62, the receiver controller 34 monitors for a hot plug handshake upon power up to detect the presence of a sink. At block 64 the receiver controller 34 also reads the soft EDID identity in the soft EDID of the transmitter. As was the case at decision diamond 58, at decision diamond 66 in the event that pairing information has already been exchanged and a display identity is read in the soft EDID, normal wireless operation commences at block 60. However, if the special identity is read by the receiver controller 34 at decision diamond 66, the process moves to block 66, wherein the receiver controller 34 alerts the transmitter controller 26 (over, e.g., the CEC bus of the cable 42) that the present reverse pairing mode exists. In one implementation the alert can be effected by sending, from the receiver controller 34 to the transmitter controller 26, a special CEC command using the device address of "display", a command that otherwise would be invalid during normal (wireless) operational mode.

In response to detecting the command, at block 70 the transmitter controller 26 commences exchange of pairing information. In one implementation the transmitter controller 26 sends, over the cable 42 (using either or both the CEC bus and I$^2$C bus), the following information to the receiver controller 34: the HDMI key selection vector (KSV) of the transmitter controller 26; a unique identification of its radio (i.e., of the wireless transmitter 30); and, if desired, its public key. These values are stored by the receiver controller 34 in persistent memory, e.g., the receiver half memory 36.

Then, at block 72 the receiver controller 34 sends its mirror pairing information over the cable 42 to the transmitter controller 26, which stores the information in, e.g., the transmitter side memory 28. Upon completion of a successful pairing information exchange, an audible or visual indication can be provided to the end user at block 74 to so indicate, so that the end user knows that the cable 42 may be disconnected, the components of FIG. 1 located at their desired locations on the user's dwelling, and normal mode wireless communication established between the source 12 and sink 14.

In an alternate embodiment, a reset button on each device 20, 22 may be monitored and if depressed for longer than a threshold period, existing pairing information is purged from the memories 28, 36. Without a value reset, each reverse pairing adds another entry into a list of authorized wireless communication partners. This refers to the table of valid partners contained in each device. Each execution of the pairing protocol with a unique device adds another entry into the table up to the maximum number permitted. The sustained reset button push may be used to purge the table for a fresh start.

FIG. 4 shows an alternate system 80 in which a wireless link is embedded in a sink such as a TV 82. As shown, a wireless receiver 84 is supported in the TV chassis for receiving wireless A/V signals from a wireless transmitter assembly 86. The assembly 86 may include a HDMI receiver 88 sending signals in the clear to a wireless transmitter 90 through a transmitter controller 92, it being understood that the transmitter assembly 86 may be substantially identical to the transmitter assembly 20 described above. Accordingly, it may include an LED 94 that functions in accordance with above principles and a computer-readable medium 96, and it may receive signals from a source 98 of high definition video that may have a HDMI transmitter 100.

Since the wireless receiver 84 is embedded in the TV 82, no intermediate HDMI stage between need be provided between the wireless receiver and the TV display 102 as shown. Instead, a selector 104 can select between the receiver 84 (which may be associated with a receiver controller 106 with computer readable medium 108 as shown), a TV tuner, and, e.g., a HDMI receiver 110 to display A/V from one of these inputs on a sink such as the TV display 102. A receiver side LED 112 may also be provided to function in accordance with above principles.

The reverse wired connection 114 in accordance with present principles is temporarily connected between the HDMI receiver 88 of the transmitter assembly 86 and the HDMI receiver 110 of the TV 82 to function in accordance with principles above to exchange pairing information.

Thus, in the embodiments shown herein wired interfaces on each device to be paired is temporarily used to exchange the pairing information. These wired interfaces typically have a formal industry standard protocol for normal operation and are used in accordance with present principles outside compliance of the standard. Two basic implementation variations are described above, namely, an in-line wireless repeater (FIG. 1) and a display device with embedded wireless receiver (FIG. 4). For the in-line repeater of FIG. 1 the wired output is looped back to the wired input, while for the embedded wireless receiver of FIG. 4 the wired input of the wireless transmitter is connected to a wired connection on the display that is normally used as an alternative input for the display.

To summarize present operation, upon energization a device detects an invalid wired topology (e.g. two displays on CEC) and suspects a "reverse connection", in which case it uses what might be regarded as "out of specification" commands (e.g. via CEC) to verify that a "reverse connection" exists. To this end, features of a wired interface (e.g. KSV values of HDCP) optionally may be used to validate potential partners. A wired interface (e.g. CEC or I2C) is then used to exchange pairing information. Upon failure to find an invalid wired topology, indicating a normal connection, wireless operation is undertaken using pairing information to establish a wireless connection.

While the particular WIRED EXCHANGE OF PAIRING INFORMATION IN WIRELESS HDMI is herein shown and described in details it is to be understood that the subject matter which is encompassed by the present invention is limited only by the claims.

What is claimed is:

1. A method comprising:
    connecting a cable to a wireless transmitter assembly, the wireless transmitter assembly for wirelessly transmitting audio/video (A/V) information from a source of data;
    connecting the cable to a wireless receiver assembly sought to be used to provide A/V information to a sink device, the sink device for displaying information from the source;
    in response to energizing the assemblies, automatically causing the transmitter assembly and receiver assembly to exchange pairing information over the cable; and using the pairing information to establish a connection for sending information from the transmitter assembly to the receiver assembly over a wireless communication path, wherein a wired output of a first one of the assemblies is looped back to a wired input of the second one of the assemblies, or a wired input of the wireless transmitter assembly is connected to a wired connection on the sink device that is otherwise used as an alternative input for the sink device, wherein the act of automatically causing includes: upon energization of the assemblies, causing the transmitter assembly to load, into a memory associated with the transmitter assembly, extended display identification data (EDID) indicating a wireless HDMI repeater;

causing the transmitter assembly to monitor for consumer electronics control (CEC) commands;

causing the receiver assembly to monitor for EDID indicating a wireless HDMI repeater and when the receiver detects such an EDID, causing the receiver to send, over a CEC bus of the cable, a signal indicating control signal connection; and in response to receiving from the receiver assembly the signal indicating control signal connection, causing the transmitter assembly to send the pairing information to the receiver assembly over the cable.

2. The method of claim 1, wherein the acts of connecting establish a temporary repurposing of wired interfaces of wireless communication components to exchange pairing information and related shared secrets.

3. The method of claim 1, comprising disconnecting the cable after exchanging pairing information and subsequently causing the assemblies to communicate with each other solely over the wireless communication path.

4. The method of claim 2, comprising detecting that at least one wired interface is not connected in accordance with industry standard protocol and thus that the interface is usable for exchanging pairing information.

5. The method of claim 2, wherein the wired interface is high definition multimedia interface (HDMI).

6. The method of claim 5, wherein at least some pairing information is exchanged over at least one of: a consumer electronics control (CEC) bus of the cable, an inter-integrated circuit (I2C) bus of the cable.

7. The method of claim 1, comprising providing audible and/or visual indication on at least one of the assemblies indicating successful exchange of the pairing information.

8. The method of claim 1, wherein the pairing information exchanged includes unique IDs of valid partners for wireless operation.

9. The method of claim 1, wherein the pairing information exchanged includes a public key or other shared secret of partner device used for secure wireless exchange of data.

10. The method of claim 1, wherein the pairing information is preserved in non-volatile memory.

11. The method of claim 10, wherein the non-volatile memory can contain pairing information for more than one valid partner.

12. The method of claim 10, wherein the non-volatile memory is purged in response to user input.

13. The method of claim 1, wherein the pairing information includes at least one high definition content protection (HDCP) key selection vector (KSV).

14. The method of claim 13, wherein the pairing information further includes at least one public key associated with a radio transmitter of the transmitter assembly.

15. An audio/video (A/V) receiver assembly configured for receiving wireless signals representing A/V for display thereof on a display, comprising:

an A/V output device configured for outputting A/V signals in a predetermined A/V format useful by the display;

a receiver controller sending A/V signals to the A/V output device; and a wireless receiver configured for receiving wireless signals from a transmitter assembly, pairing information necessary for wireless communication of A/V from a source to a sink being exchanged by the receiver controller and transmitter assembly automatically over a cable, wherein the predetermined format is high definition multimedia interface (HDMI), and wherein:

upon energization of the assemblies with the cable connected, the receiver assembly monitors for extended display identification data (EDID) from the transmitter assembly indicating a wireless HDMI repeater;

when the receiver controller detects such an EDID, the receiver assembly sends, over a CEC bus of the cable, a signal indicating control signal connection; and the receiver assembly receives from the transmitter assembly pairing information over the cable.

16. The A/V receiver assembly of claim 15, wherein the pairing information is received upon connecting the cable to the assemblies and energizing the assemblies.

17. An audio/video (A/V) transmitter assembly configured for transmitting wireless signals representing A/V from a source of A/V, comprising:

a receiver configured for receiving from the source A/V signals in a predetermined A/V format;

a transmitter controller receiving A/V signals from the receiver; and a wireless transmitter configured for wirelessly transmitting signals from the transmitter controller to a receiver assembly associated with a sink, wherein pairing information necessary for wireless communication of A/V from the source to the sink is received by the transmitter controller automatically over a cable from the receiver assembly, wherein responsive to detection of an invalid wired topology involving the transmitter controller and/or receiver assembly, the pairing information is exchanged over the cable, and responsive to a determination that an invalid wired topology does not exist, wireless communication between the transmitter and receiver is undertaken using the pairing information to establish a wireless connection; and includes: wherein upon energization of the assemblies, the transmitter assembly loads into a memory associated with the transmitter assembly, extended display identification data (EDID) indicating a wireless HDMI repeater;

the transmitter assembly monitors for consumer electronics control (CEC) commands;

the receiver assembly monitors for EDID indicating a wireless HDMI repeater and when it detects such an EDID, the receiver assembly sends over a CEC bus of the cable, a signal indicating control signal connection; and in response to receiving from the receiver assembly the signal indicating control signal connection, the transmitter assembly sends the pairing information to the receiver assembly over the cable.

* * * * *